(12) United States Patent
Storz et al.

(10) Patent No.: US 7,483,207 B2
(45) Date of Patent: Jan. 27, 2009

(54) APPARATUS FOR MOUNTING MULTIPLE LASERS, AND MICROSCOPE

(75) Inventors: Rafael Storz, Pfaeffikon (CH); William C. Hay, Heppenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 91 days.

(21) Appl. No.: 11/610,122

(22) Filed: Dec. 13, 2006

(65) Prior Publication Data

US 2007/0154140 A1 Jul. 5, 2007

(30) Foreign Application Priority Data

Dec. 14, 2005 (DE) .................. 10 2005 059 650

(51) Int. Cl.
G02B 21/06 (2006.01)
G02B 21/00 (2006.01)

(52) U.S. Cl. .................. 359/390; 359/368; 359/385

(58) Field of Classification Search ......... 359/368–390, 359/618–630, 819
See application file for complete search history.

(56) References Cited

U.S. PATENT DOCUMENTS

| | | | | |
|---|---|---|---|---|
| 2,589,569 | A * | 3/1952 | Hurst et al. | 340/815.56 |
| 3,914,013 | A | 10/1975 | Rosenberg | |
| 4,825,034 | A | 4/1989 | Auvert et al. | |
| 5,013,111 | A * | 5/1991 | Tilly et al. | 385/95 |
| 5,640,188 | A * | 6/1997 | Andrews | 347/130 |
| 6,606,332 | B1 * | 8/2003 | Boscha | 372/42 |
| 7,042,638 | B2 | 5/2006 | Gonschor et al. | |
| 2004/0047032 | A1 | 3/2004 | Gonschor et al. | |
| 2007/0279938 | A1 * | 12/2007 | Miwa et al. | 362/613 |

FOREIGN PATENT DOCUMENTS

| | | |
|---|---|---|
| DE | 196 49 605 A1 | 6/1998 |
| DE | 102 29 935 A1 | 1/2004 |
| DE | 103 61 177 A1 | 7/2005 |
| DE | 10 2004 039 035 A1 | 10/2005 |

OTHER PUBLICATIONS

English abstract and figure 1 of the RU reference No. 2244871 issued to Markov V N on Jan. 20, 2005.*

* cited by examiner

*Primary Examiner*—Thong Nguyen
(74) *Attorney, Agent, or Firm*—Foley & Lardner LLP

(57) ABSTRACT

An apparatus for mounting for multiple lasers (16a, 16b, 16c) is disclosed. The multiple lasers (16a, 16b, 16c) generate light that is guided via a light-guiding fiber to an optical system (10). Provided for that purpose on the mounting plate (15) is a combining unit (18) that comprises multiple input ports (18a, 18b, 18c). Each of the lasers (16a, 16b, 16c) possesses an output (25a, 25b, 25c) for its light, each laser (16a, 16b, 16c) being mounted on the mounting plate (15) in such a way that the respective output (25a, 25b, 25c) is colinear with the respective pertinent input port (18a, 18b, 18c) of the combining unit (18). The combining unit (18) combines the light of the multiple lasers (16a, 16b, 16c) into a single beam (30).

19 Claims, 7 Drawing Sheets

APPARATUS FOR MOUNTING MULTIPLE LASERS, AND MICROSCOPE

CROSS-REFERENCE TO RELATED PATENT APPLICATIONS

The right of foreign priority is claimed under 35 U.S.C. § 119(a) based on Federal Republic of Germany Application No. 10 2005 059 650.9 filed Dec. 14, 2005, the entire contents of which, including the specification, drawings, claims and abstract, are incorporated herein by reference.

BACKGROUND OF THE INVENTION

The invention relates to an apparatus for mounting for multiple lasers. The invention relates in particular to an apparatus for mounting for multiple lasers, such that a light-guiding fiber guides light of the multiple lasers from a mounting plate to an optical system.

The invention further relates to a microscope that uses multiple lasers to illuminate a specimen. The invention relates in particular to a microscope that comprises an apparatus for mounting for multiple lasers, such that a light-guiding fiber transports light of the multiple lasers from a mounting plate to the microscope.

German Unexamined Application DE 196 49 605 A1 discloses a fluorescence correlation spectroscopy module for a microscope. The module is affixed on the microscope with a flange connection. The light deriving from a laser can be coupled into the module via a flange connection, with an optical waveguide. The document does not disclose how light of multiple wavelengths can be coupled into a microscope. In addition, this document also does not disclose how ease of service is implemented in the context of multiple lasers for coupling into a microscope.

German Unexamined Application DE 102 29 935 A1 discloses a device for coupling light into a microscope. Laser light is directed onto the sample in the field diaphragm plane by way of a light-guiding fiber incoupling system embodied as a slider. The document does not disclose whether the light of more than one laser is coupled into the microscope. Also not disclosed is how the coupling of multiple lasers into the light-transporting light-guiding fiber is carried out.

German Unexamined Application DE 10 2004 039 035 A1 discloses a method and an apparatus for fluorescence-lifetime nanoscopy. The light of the lasers that are provided is directed, by means of optical elements such as lenses, light guides, filters, beam splitters, and/or mirrors, to a nanoscopy unit. The document does not, however, disclose how these lasers are optically and mechanically coupled, and how their coupling into the optical fiber is carried out.

SUMMARY OF THE INVENTION

It is an object of the present invention to create a simple incouple, independent of various laser types, of laser light into a light-guiding fiber leading to an optical system.

The object is achieved by an apparatus for mounting for multiple lasers, such that a light-guiding fiber guides light of the multiple lasers affixed on a mounting plate to an optical system, wherein a combining unit is affixed on the mounting plate, the combining unit comprising multiple input ports; each laser comprises an output for light; each laser is mounted on the mounting plate in such a way that the respective output of a laser is colinear with the respectively pertinent input port of the combining unit; and the combining unit combines the light of the multiple lasers into a single beam.

A further object of the invention is to create a microscope that makes possible simple incoupling, independent of the various laser types, of laser light into the microscope.

The object is achieved by a microscope wherein multiple lasers are arranged on a mounting plate; the mounting plate is enclosed, together with the lasers, by a housing; and a light-guiding fiber guides the light of the multiple lasers from the housing to the microscope.

It is advantageous if the apparatus for mounting for multiple lasers is equipped with a light-guiding fiber that transports the light of the multiple lasers from the mounting plate to an optical system. The mounting plate itself possesses a combining unit that comprises multiple input ports. Each laser likewise comprises an output port for light. The lasers are mounted or arranged on the mounting plate in such a way that the respective output of a laser is colinear with the pertinent input port of the combining unit. The combining unit combines the light of the multiple lasers into a single beam.

The combining unit is further embodied with an output port that is in operative correlation with an incoupling element of the light-guiding fiber. The combining unit furthermore possesses at least two input ports for the light of the lasers.

The mounting plate for the lasers and the combining unit possesses an upper side and a lower side. The upper side carries the combining unit and the multiple lasers. The lower side carries at least one further laser and electronic components that are necessary for controlling and operating the lasers on the mounting plate.

The light of the at least one further laser that is provided on the lower side of the mounting plate is guided via a deflecting system to the incoupling element of the light-guiding fiber, and is likewise colinear with the light of the combining unit.

The lasers are mounted on the mounting plate with an adapter plate.

The adapter plate is embodied for each laser in such a way that upon mounting of the laser, together with the adapter plate, on the mounting plate, the output of the respective laser is colinear with the respective input port of the combining unit.

Embodied in the mounting plate, for each adapter plate, is a milled recess in which the unit made up of laser and adapter plate is then mounted. The milled recess in the mounting plate is larger in length and width than the length and width of the adapter plate, so that an alignment of the output of the laser with respect to the associated input of the combining unit is enabled, or form an accurately fitted stop for the adapter plate.

The mounting plate is enclosed, together with the lasers, by a housing. The light-guiding fiber guides the light of the combined lasers to the optical system.

The optical system can be a laser scanning microscope or a wide-field microscope.

The microscope receives the illuminating light by the fact that multiple lasers are arranged on a mounting plate; that the mounting plate is enclosed, together with the lasers, by a housing; and that a light-guiding fiber guides the light of the multiple lasers from the housing to the microscope.

Further advantageous embodiments of the invention are evident from the dependent claims.

Further objects, features and advantages of the present invention will become apparent from the detailed description of preferred embodiments that follows, when considered together with the accompanying figures of drawing.

BRIEF DESCRIPTION OF THE DRAWINGS

The subject matter of the invention is depicted schematically in the drawings and will be described below with reference to the Figures, in which.

DETAILED DESCRIPTION OF THE PREFERRED EMBODIMENTS

Figure 1:
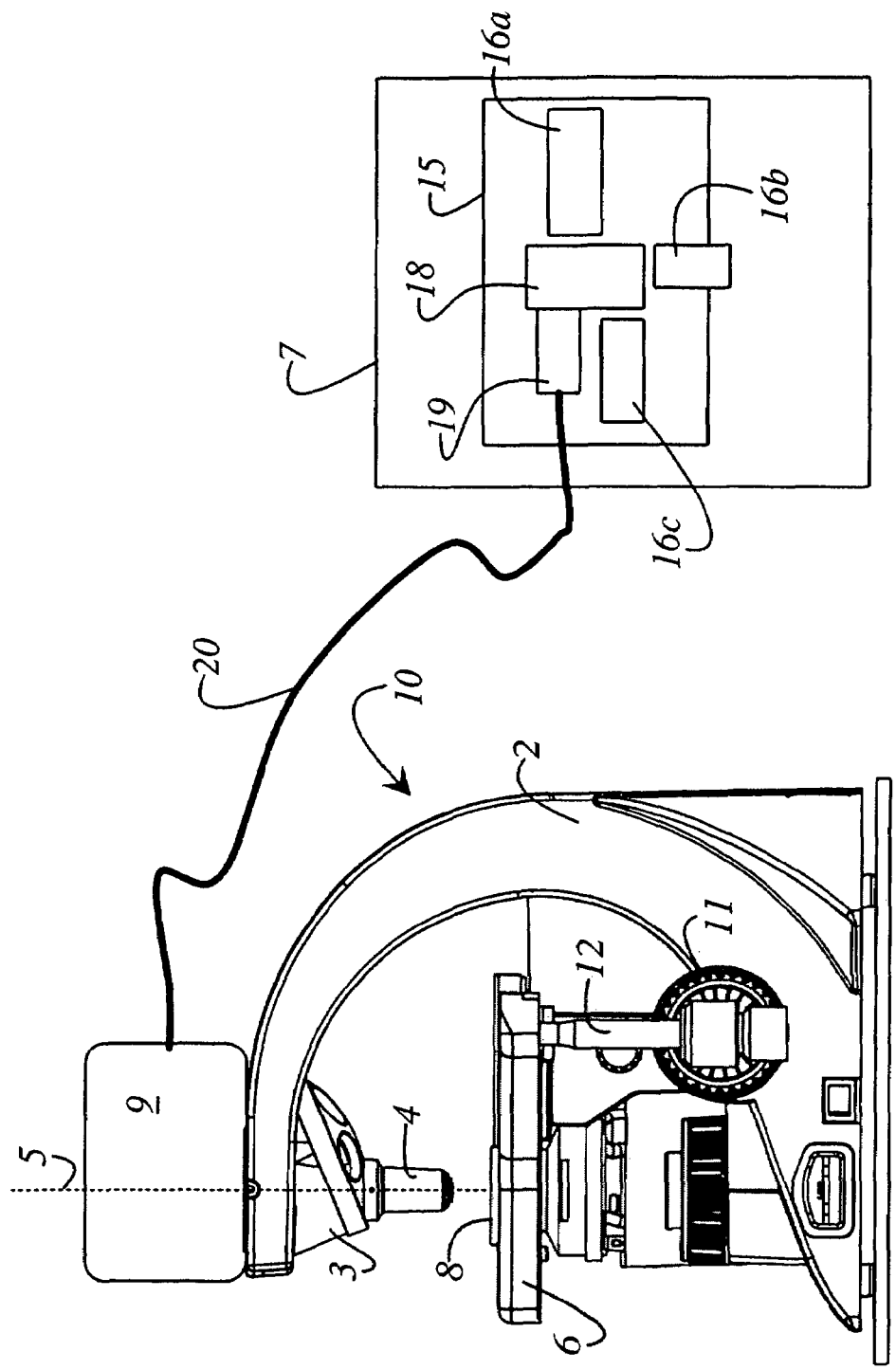
FIG. 1 schematically depicts an optical system and a mounting plate, provided in a housing, for multiple lasers, the laser light being transported from the mounting plate to the optical system using a light-guiding fiber.

FIG. 1 shows an optical system 10, associated with which is a housing 7 from which a light-guiding fiber 20 leads to the optical system. Optical system 10 is in this case a microscope that is equipped with a scanning unit 9. Optical system 10 encompasses a microscope stand 2 and a revolving nosepiece 3, affixed on microscope stand 2, that carries at least one objective 4. Objective 4 can be pivoted, by way of the nosepiece, into a working position. Also provided on microscope stand 2 is a microscope stage 6 on which a specimen 8 to be examined can be placed. Microscope stage 6 can be displaced, by means of an apparatus for microscope stage displacement and focusing of specimen 8, parallel to optical axis 5 of objective 4. The parallel displacement of microscope stage 6 is accomplished by way of at least one operating element 11 provided on the stand. Affixed on microscope stage 6 is a further displacement element 12 with which a displacement of microscope stage 6 perpendicular to optical axis 5 is accomplished. Provided in housing 7, inter alia, is a mounting plate 15. From mounting plate 15, light-guiding fiber 20 leads to optical system 10. Three lasers 16a, 16b, 16c, whose light is coupled into a combining unit 18, are arranged on the mounting plate. Combining unit 18 is connected to an incoupling element 19 of light-guiding fiber 20, so that the light from lasers 16a, 16b, 16c combined in combining unit 18 can be coupled into light-guiding fiber 20.

Figure 2:
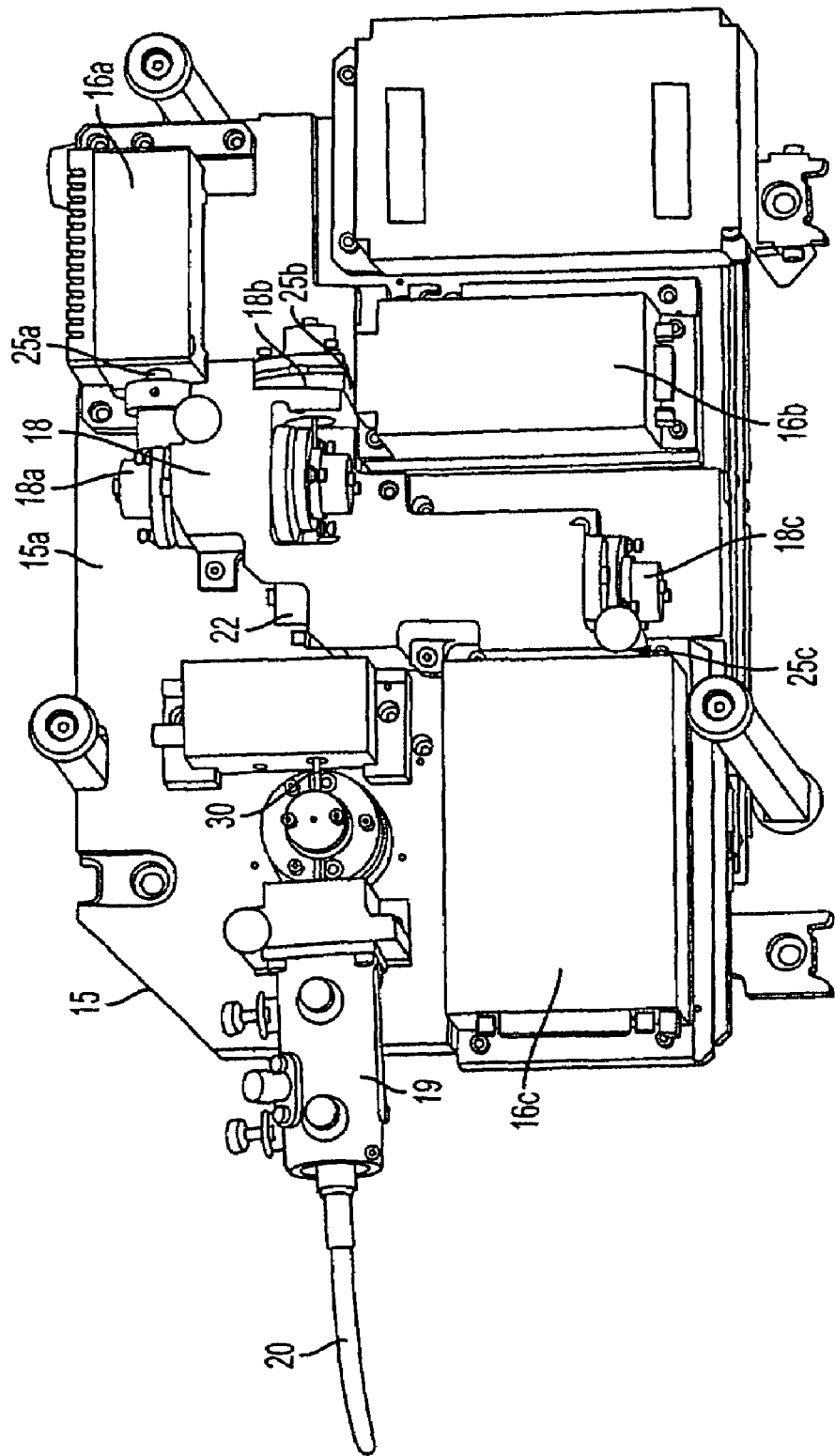
FIG. 2 is a plan view of the upper side of the mounting plate.

FIG. 2 is a plan view of mounting plate 15. In the embodiment shown in FIG. 2, a first laser 16a, a second laser 16b, and a third laser 16c are arranged on the mounting plate. First laser 16a, second laser 16b, and third laser 16c send the laser light emanating from them into a combining unit 18. Combining unit 18 comprises an input port 18a associated with first laser 16a. Combining unit 18 likewise comprises an input port 18b associated with second laser 16b. Combining unit 18 furthermore comprises an input port 18c associated with third laser 16c. Combining unit 18 additionally possesses an output port 22 out of which combined light beam 30 is transferred into incoupling element 19 of light-guiding fiber 20. First laser 16a, second laser 16b, and third laser 16c are mounted on mounting plate 15 in such a way that output 25a of first laser 16a is colinear with input port 18a of combining element 18, output port 25b of second laser 16b is likewise colinear with input port 18b of combining element 18, and output 25c of third laser 16c is colinear with input port 18c of combining element 18.

Figure 3:
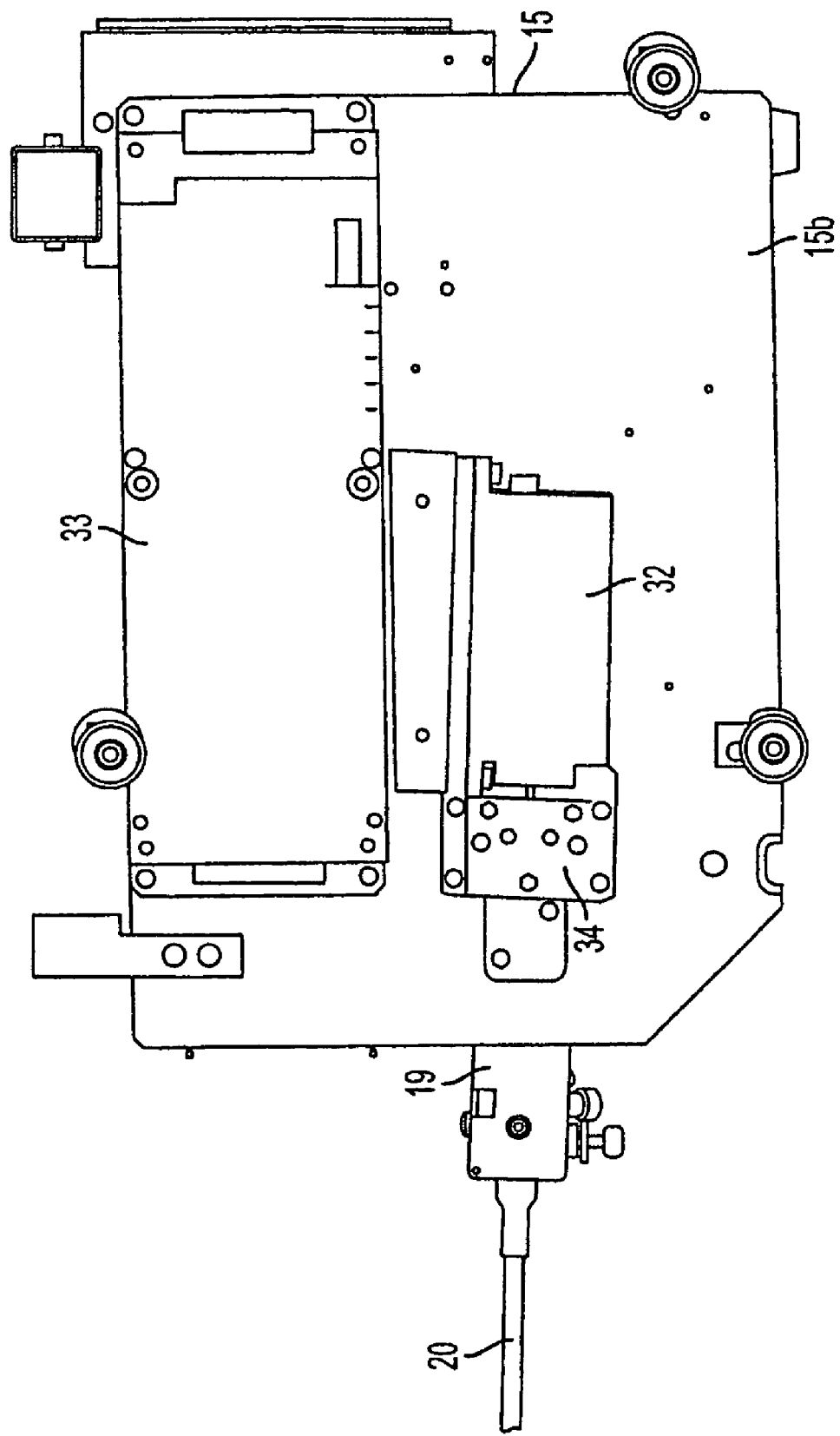
FIG. 3 is a plan view of the lower side of the mounting plate.

FIG. 3 shows lower side 15b of mounting plate 15. A further laser 32 can be affixed on lower side 15b of mounting plate 15. The light of further laser 32 is guided via a deflection system 34 to incoupling element 19 on upper side 15a of the mounting plate. Also mounted on lower side 15b of the mounting plate is an electronic unit 33 that is provided for control and regulation of the various lasers 16a, 16b, 16c, 32 joined to mounting plate 15.

Figure 4:
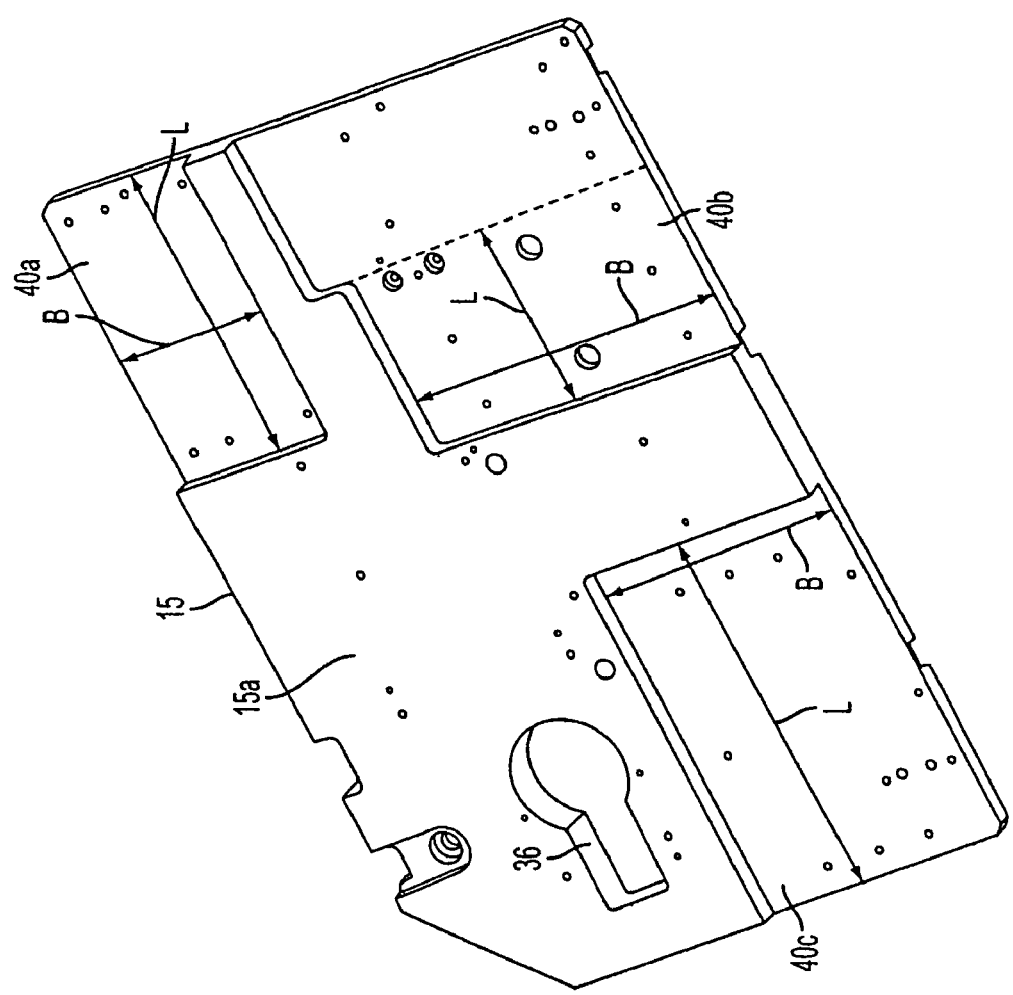
FIG. 4 is a perspective view of the mounting plate in which all the elements or components that can be arranged on the mounting plate have been removed.

FIG. 4 is a plan view of upper side 15a of mounting plate 15, all the elements that can be arranged on the mounting plate, for example lasers and/or electronic units, having been removed so as thereby to allow a better view of the configuration of mounting plate 15. Mounting plate 15 comprises multiple recesses 40a, 40b, 40c into which a laser, together with an adapter plate 50 (see FIG. 5), can be placed. Each of the milled recesses 40a, 40b, 40c shaped into mounting plate 15 has a respective length L and width B. The length L and width B of milled recesses 40a, 40b, 40c are dimensioned in such a way that they are larger than the dimensions, in terms of length 51 and width 52, of adapter plate 50 for the respective laser. The fact that milled recesses 40a, 40b, 40c are larger than the adapter plates associated with the respective lasers has the advantage that when the respective laser is mounted on mounting plate 15, a certain clearance can be provided for alignment of the output of the respective laser with the input port of combining unit 18. Also possible, however, is the mounting of already preadjusted optical assemblies on a stop of the milled recess, so that laborious alignment can be omitted.

Figure 5:
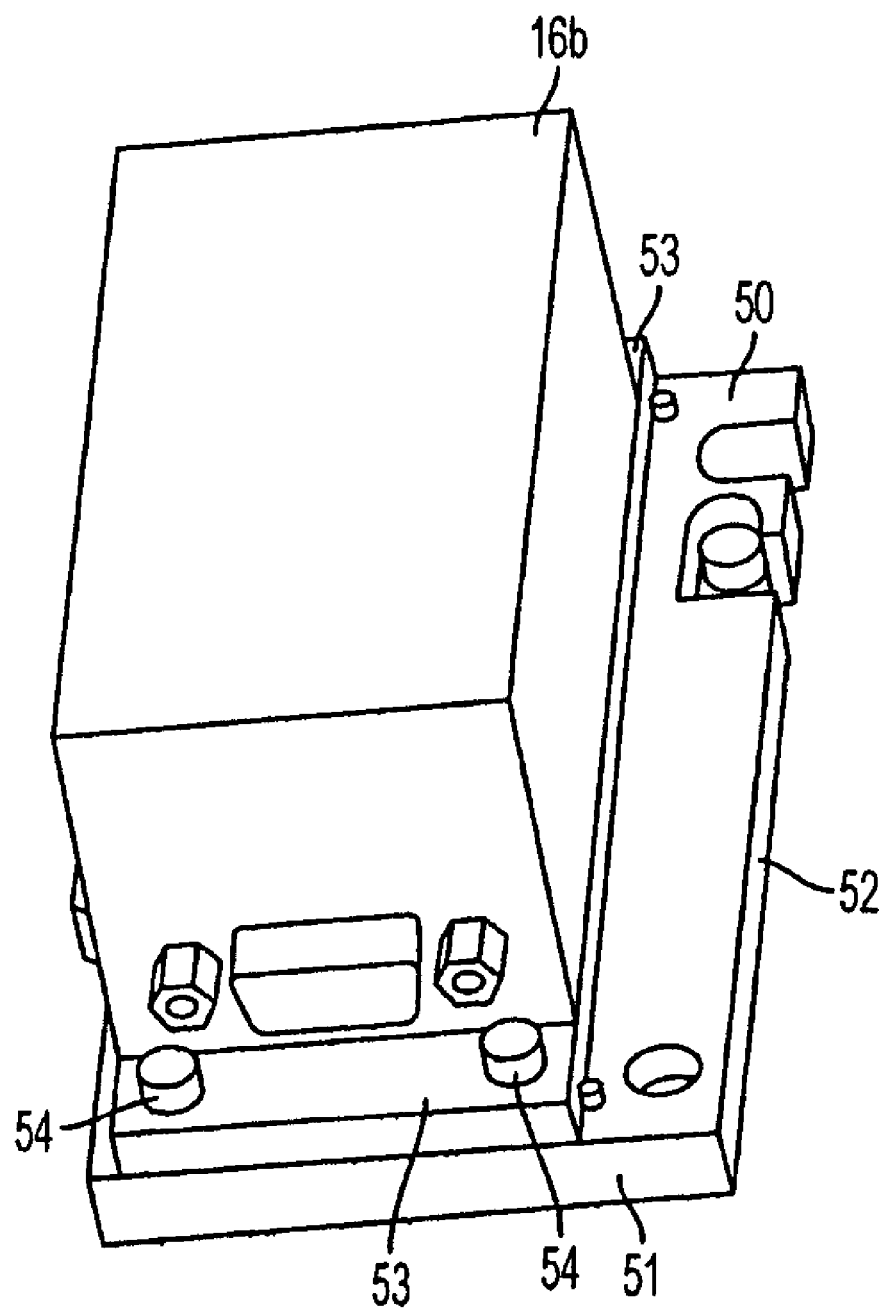
FIG. 5 shows a laser, with an adapter plate affixed on the laser.

FIG. 5 is a perspective view of laser 16b that is mounted on adapter plate 50. As already mentioned in the description of FIG. 4, laser 16b, together with adapter plate 50, is placed into the corresponding milled recess 40b on mounting plate 15. The individual adapter plates for the various lasers are necessary so that lasers 16a, 16b, 16c affixed on mounting plate 15 are colinear, with their respective outputs, with the corresponding associated input ports of combining unit 18, and so that the combining unit combines the light of the multiple lasers 16a, 16b, 16c into a single beam. Laser 16b itself is equipped with corresponding mounting elements 53 with which laser 16b can be affixed on adapter plate 50 by means of screws 54.

Figure 6:
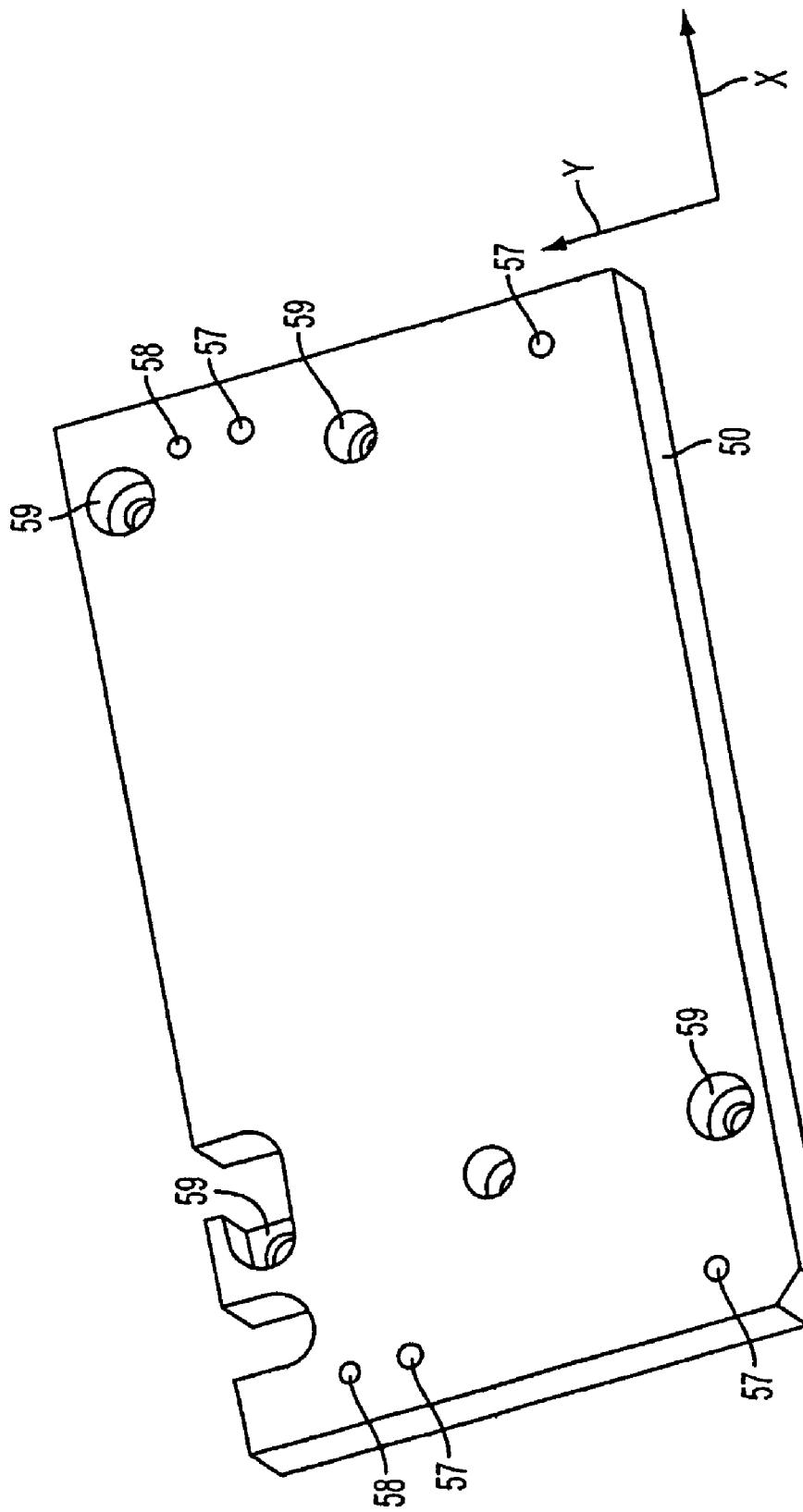
FIG. 6 is a perspective view of an adapter plate.

FIG. 6 is a perspective view of adapter plate 50. Adapter plate 50 comprises threaded holes 57 with which laser 16b is affixed, with screws 54, on adapter plate 50. For an initial adjustment of laser 16b, stops or orifices for locating pins 58 are embodied on adapter plate 50. Also embodied in plate 50 are multiple orifices 59 for the passage of screws (not depicted) with which adapter plate 50 can be affixed on mounting plate 15. Orifices 59 are made somewhat larger so that further alignment of the laser with respect to the input port of combining element 18 is possible. Alignment is accomplished chiefly by way of a movement of adapter plate 50 in the X-Y plane.

Figure 7:
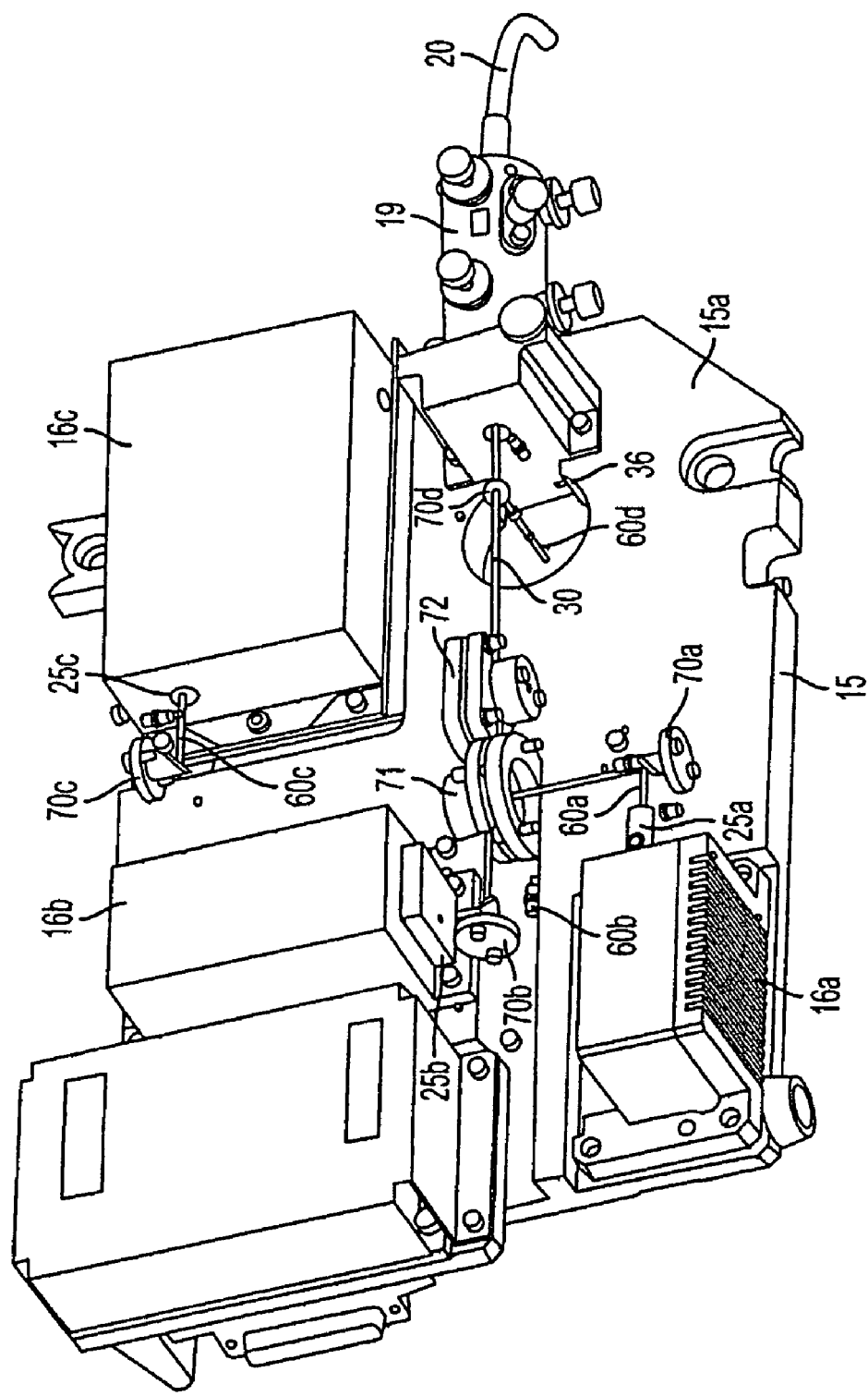
FIG. 7 is a perspective view of the mounting plate, portions of the mounting plate being removed in order to elucidate the routing of the combined laser beams on the mounting plate.

FIG. 7 is a perspective top view of upper side 15a of the mounting plate. Portions of the combining element have been removed so as thereby to elucidate a better view of the combining of the light beams, coming from the multiple lasers, into a single colinear beam. First laser 16a sends, via an output 25a, light beam 60a to a deflection element 70a. Second laser 16b sends, via output 25b, light beam 60b to a deflection element 70b. The two light beams 60a and 60b are combined, in a combination element 71, into a common light beam (not depicted). A third laser 16c sends, via an output 25c, a light beam 60c to a deflection element 70c. Laser beam 60c strikes a further combination element 72, and is combined there with the already combined light beams 60a and 60b into a single light beam. Care must be taken that the arrangement of lasers 16a, 16b, 16c on mounting plate 15 always meets the condition that all the light beams 60a, 60b, 60c emitted by lasers 16a, 16b, 16c are brought together by combining element 18 into a single colinear beam 30. Embodied in mounting plate 15 is an opening 36 through which a laser beam 60d travels to a deflection element 70d, which combines the already combined laser beam 30 with laser beam 60d and lastly guides it into incoupling element 19 of light-guiding fiber 20. Laser beam 60d is generated by laser 32 arranged on lower side 15b of mounting plate 15.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An apparatus for mounting multiple lasers, such that a light-guiding fiber guides light of the multiple lasers affixed on a mounting plate to an optical system,
    wherein a combining unit is affixed on the mounting plate, the combining unit comprising multiple input ports;
    each laser comprises an output for light;
    each laser is mounted on the mounting plate in such a way that the respective output of a laser is colinear with an input port of the combining unit;
    the mounting plate comprises an upper side and a lower side, the upper side carrying the combining unit and the multiple lasers, and the lower side carrying at least one further laser; and
    the combining unit combines the light of the multiple lasers into a single beam.

2. The apparatus according to claim 1, wherein the combining unit comprises an output port that is connected to a coupling element of the light-guiding fiber; and
    the combining unit comprises at least two input ports for the light of the lasers.

3. The apparatus according to claim 1, wherein the light of the at least one further laser on the lower side of the mounting plate is guided via a deflecting system to a coupling element of the light-guiding fiber, and is colinear with the light of the combining unit.

4. The apparatus according to claim 1, wherein the lasers are mounted on the mounting plate with an adapter plate.

5. The apparatus according to claim 4, wherein each of the multiple lasers has a corresponding adapter plate, and wherein the adapter plate for each laser is shaped such that upon mounting of the laser, together with the adapter plate, on the mounting plate, the output of the respective laser is colinear with the respective input port of the combining unit.

6. The apparatus according to claim 5, wherein the mounting plate comprises a milled recess for each adapter plate.

7. The apparatus according to claim 6, wherein the milled recess is larger in length and width than the length and width of the adapter plate, so that an alignment of the output of the laser with respect to the associated input port of the combining unit is enabled.

8. The apparatus according to claim 6, wherein the milled recess of the mounting plate serves as a stop for the adapter plate, so that an alignment of the output of a laser with the respective input port of the combining unit is ensured.

9. The apparatus according to claim 1, wherein the mounting plate comprises an electronic unit mounted thereon.

10. The apparatus according to claim 1, wherein the mounting plate is enclosed, together with the lasers, in a housing.

11. The apparatus according to claim 10, wherein the light-guiding fiber guides the light of the combined lasers from the housing to the optical system.

12. The apparatus according to claim 1, wherein the optical system is a laser scanning microscope or a wide-field microscope.

13. A microscope, comprising:
    multiple lasers arranged on a mounting plate;
    the mounting plate comprising an upper side and a lower side, the upper side carrying a combining unit and the multiple lasers, and the lower side carring at least one further laser;
    wherein the mounting plate is enclosed, together with the lasers, by a housing; and
    a light-guiding fiber guides the light of the multiple lasers from the housing to the microscope.

14. The microscope according to claim 13, wherein the combining unit is affixed on the mounting plate, the combining unit comprising multiple input ports;
    wherein each laser comprises an output for light; and
    each of the multiple lasers is mounted on the mounting plate in such a way that the respective output of a laser is colinear with a respective input port of the combining unit; and
    the combining unit combines the light of the multiple lasers into a single beam.

15. The microscope according to claim 14, wherein the lasers are mounted on the mounting plate with an adapter plate.

16. The microscope according to claim 15, wherein each of the multiple lasers has a corresponding adapter plate, and wherein the adapter plate for each laser is shaped such that upon mounting of the laser, together with the adapter plate, on the mounting plate, the output of the respective laser is colinear with the respective input port of the combining unit.

17. A method for providing light to an optical device, comprising:
    providing a mounting plate comprising an upper side comprising multiple lasers mounted thereon and a lower side comprising at least one additional laser;
    providing a combining unit for combining respective beams of the multiple lasers; and
    providing an output of the combining unit connected to a fiber for guiding the combined light to an optical system.

18. The method of claim 17, further comprising the step of:
    providing an adapter plate for mounting each of the multiple lasers to the mounting plate; wherein the adapter plates are shaped such that an output of the respective laser is colinear with a respective input port of the combining unit.

19. The method of claim 17, further comprising the step of: connecting the fiber to the optical system.

* * * * *